March 15, 1938.  G. J. BASEL  2,111,059

FLEXIBLE DOOR PULL AND ARM REST FOR AUTOMOBILES

Filed Sept. 23, 1936

Inventor:
George Joseph Basel by Lawler & Lawler
attys.

Patented Mar. 15, 1938

2,111,059

UNITED STATES PATENT OFFICE 2,111,059

FLEXIBLE DOOR PULL AND ARM REST FOR AUTOMOBILES

George Joseph Basel, Cleveland, Ohio

Application September 23, 1936, Serial No. 102,148

2 Claims. (Cl. 268—3)

This invention relates to a flexible pull device by means of which an automobile door may be closed from the driver's position behind the steering wheel without leaving his position.

This invention is an improved means for closing an automobile door and is specially useful in closing the door from the driver's position behind a steering wheel. The door as it is now closed requires the driver, if alone on the front seat in the car, after entering the car to pull the door behind him and then position himself behind the steering wheel. With this device, on entering the automobile, the driver may first position himself behind the steering wheel and then reach for the pull, and pull the door fastened to the pull to closed position, from his position behind the steering wheel.

The pull may be so constructed that it is provided with a hanger or arm rest, to be used by an occupant in the car when not being used as a door pull. The pull may be so constructed that it can be adjusted as to length after being installed in the vehicle.

With these and other objects in view, the invention consists in certain novel features of construction, as will be more fully described and particularly pointed out in the appended claims.

An embodiment of the invention as applied to an automobile, is hereafter described and illustrated in the accompanying drawing.

Figure 1:
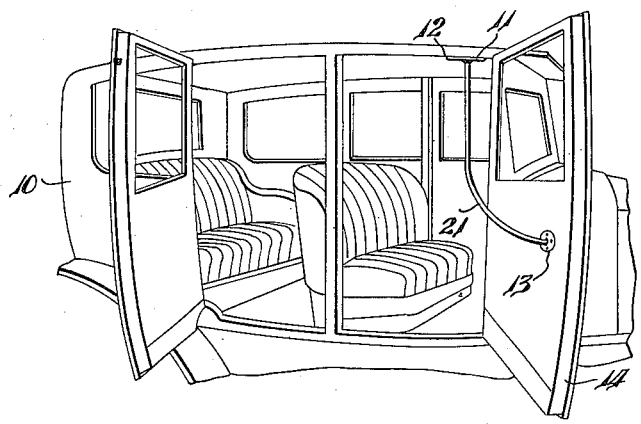
Figure 1 is a view in perspective of an automobile body showing the present invention mounted and incorporated therein.

In Figure 1, 10 is an automobile body, 11 a fastening plate, in which the upper end of the pull 21 is secured in a suitable manner. The plate is secured to the interior of the car or automobile body, forwardly and upwardly of the front seat as at 12, and to the right of the driver, if the automobile be a left hand drive. The lower end of the pull is likewise provided with a fastening plate 13 fastened to the automobile door 14.

Figure 2:
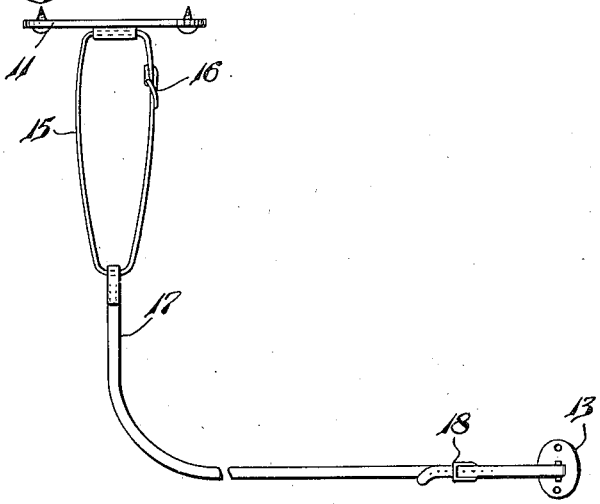
Figure 2 is a view in side elevation showing the pull made up of two components, the arm rest being formed by one, and the remainder of the pull being connected thereto. The securing plates are also shown, one at each end of the pull, and the adjusting means in the arm rest and also in the unit constituting the remainder of the pull.
Figure 3:
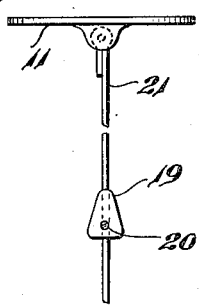
Figure 3 is a fragmentary view of a pull, showing a means to prevent the hand from slipping along the pull. This device may be employed rather than the arm rest.

The pull may be provided with an arm rest 15 as shown in Fig. 2. The arm rest may be provided with an adjusting means such as a buckle 16 through the aid of which the arm rest may be lengthened or shortened. The other section 17 of the pull may be likewise provided with an adjusting means 18, of buckle construction to facilitate it being adjusted if desired.

The pull may be provided with means 19 of egg or other suitable geometric shape, adapted to prevent the hand slipping on the pull if used instead of an arm rest. The means may be moved up or down on the pull by releasing and resetting the screw 20 in the means 19.

The pull may be an integral structure as shown in Figure 1, or a combination of two or more components as shown in Figure 2.

The pull is flexible; the flexibility is necessary to compensate for want of alignment between the fastening plates and also to permit gravitational movement of the pull to position itself when the automobile door is open, and likewise when it is closed to bring about the desired position of the pull. The pull may be made of leather, suitable fabric, rope or the like if desired.

It is obvious that the fastening plates may be of conventional configuration and be supplied with ornamentation to conform to a common theme running through the artistic creation displayed in the interior of the automobile body.

As a consequence of the gravitational movement of the pull, when the door is opened as well as when closed in positioning the same, the invention embraces all cases in which use is made of gravitational force to position the pull in accordance with the above explanation.

It is believed that the operation of the device as a whole will be clear, in view of the foregoing description which has been given in connection with the construction of the same.

I am aware that my invention may be embodied in other specific forms without departing from the spirit or essential attributes thereof; and I therefore desire that the present embodiments be considered in all respects as illustrative and not restrictive, reference being had to the appended claims rather than the foregoing description to indicate the scope of the invention.

What I claim is:—

1. In a combined arm rest and door pull for an automobile door, a flexible arm rest component of a loop configuration having its upper end fixedly attached to the superstructure supporting an automobile roof structure, the attaching area of the attachment being laterally and forwardly of a steering wheel in the automobile and adjacent to the upright supporting structure supporting the roof superstructure, a pull component, the pull component being of a flexible cable construction and being affixed at its upper end to the lower end of the arm rest component, the lower end of the pull component being attached to a door hinged on the upright supporting structure, the combined arm rest and pull being adaptable for the door pull when grasped intermediate between their attachment and manually pulled toward a driver seated behind the steering wheel.

2. In a combined arm rest and door pull for an automobile door, an attaching plate, a flexible length adjustable arm rest component of loop configuration in the attaching plate, the attaching plate fixedly attached to the superstructure supporting an automobile roof structure, the attaching area of the attaching plate being laterally and forwardly of a steering wheel in an automobile and adjacent the upright supporting structure supporting the roof superstructure, a pull component, the pull component being of flexible construction, and being attached at its upper end to the arm rest, an attaching plate for the lower end of the pull component, the attaching being attached to an automobile door supported by and hinged to the upright supporting structure supporting the roof superstructure, the lower end of the pull component being affixed in the aforesaid attaching plate, the combined arm rest and pull components being adaptable for a door pull when grasped intermediate between their attachments and manually pulled toward a driver when seated behind the steering wheel.

GEORGE JOSEPH BASEL.